May 21, 1929.  E. CHALLET  1,713,743
METHOD FOR TRUING UP THE MEASURING JAWS OF SLIDING CALIPERS
Filed July 14, 1927
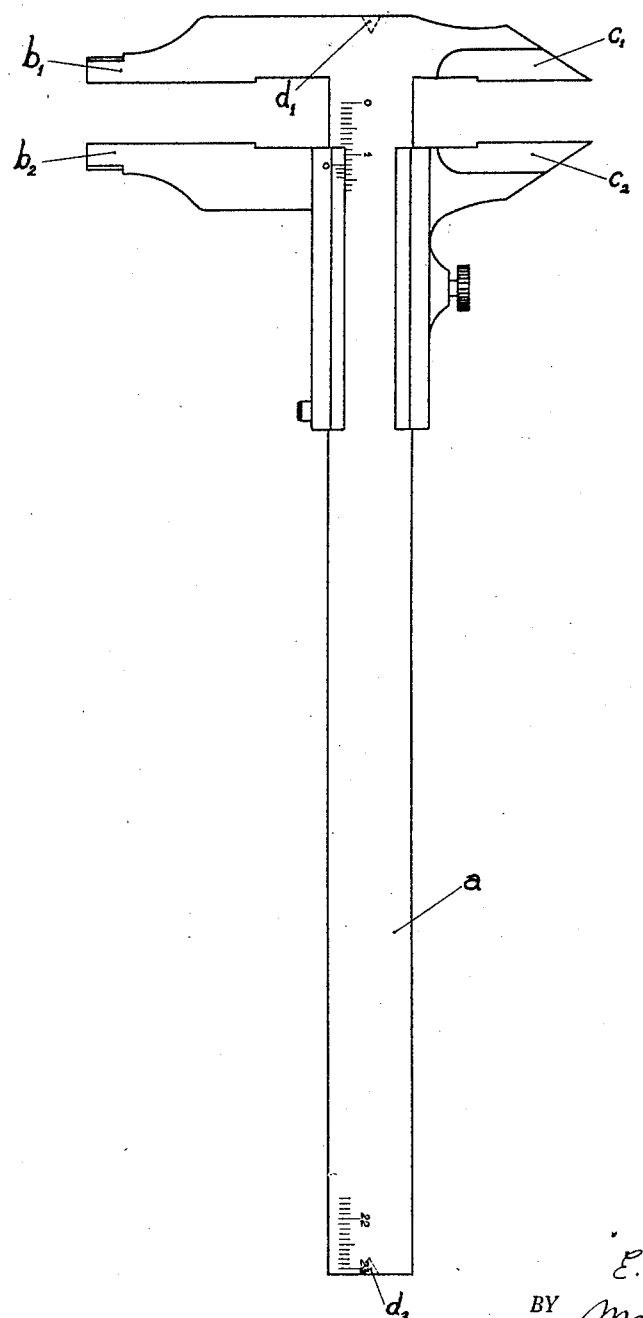
INVENTOR.
E. Challet
BY Marks & Clerk
ATTORNEYS.

Patented May 21, 1929.

1,713,743

UNITED STATES PATENT OFFICE.

ETIENNE CHALLET, OF GENEVA, SWITZERLAND, ASSIGNOR TO MAURICE ARTHUR BOREL, OF PONTARLIER, FRANCE.

METHOD FOR TRUING UP THE MEASURING JAWS OF SLIDING CALIPERS.

Application filed July 14, 1927, Serial No. 205,790, and in Switzerland June 11, 1927.

The subject of the present invention is a method for truing the measuring jaws of sliding calipers comprising four measuring jaws, two on each side of the bar. According to this method, which is more simple and accurate then those at present in use, a centering hole is formed at each end of the bar, the axis of these two holes lying on one and the same straight line parallel to the longitudinal axis of the bar or upon the axis itself of this bar, the sliding calipers are centered between centres by these two holes, the first pair of jaws are ground, the calipers are turned through 180° and then the second pair of jaws is ground.

The accompanying drawing refers to one example of the mode of carrying the process according to the present invention into effect.

In the drawing $a$ is the bar, $b^1$ and $b^2$ are two measuring jaws placed on the left hand side of the bar and $c^1$ and $c^2$ are the other two measuring jaws terminating in sharp points which permit them to be used also for scribing.

At each end of the longitudinal axis of the bar are formed two centering holes $d^1$ and $d^2$ the function of which is as follows: up to the present time, in order to grind the jaws, the bar has been fixed in a device which occupied the whole of one of the long sides of the latter; after grinding the jaws $b^1$ and $b^2$ it was necessary to release the device, turn over the sliding calipers and tighten up the device again in order to be able to grind the jaws $c^1$ and $c^2$, which operations were very delicate to perform if it was desired to avoid moving the calipers out of centre relatively to the grindstone. By means of the holes $d^1$ and $d^2$ the sliding calipers may during the grinding operations be fixed between centres; once the arms $b^1$ and $b^2$ have been ground, it will be possible to turn the calipers through 180° in order to bring the arms $c^1$ and $c^2$ in front of the grinder without there being any fear of producing any out of centre of the calipers.

Further, once the sliding calipers have been completed, the holes $d^1$ and $d^2$ will permit the calipers to be mounted between centres, thus facilitating greatly certain measuring operations, as the calipers can then turn around the geometric axis of these points.

I claim:

The method of truing the measuring jaws of a sliding caliper gage having measuring jaws on both sides of its beam, which consists first in providing a centering hole in each end face of the beam, said holes being situated in a line parallel with the longitudinal axis of the beam, placing the beam between centers, effecting a certain amount of grinding on the contact face of one of the measuring jaws, turning the beam for 180° about the axis of the centers, and effecting the same amount of grinding on the contact face of the opposite measuring jaws.

In testimony whereof I affix my signature.

ETIENNE CHALLET.